SIGNAL TRANSLATION SYSTEM

Filed May 23, 1955 2 Sheets-Sheet 1

INVENTORS
JOHN C. GROCE
JOHN K. BATES, JR.
DUNCAN G. HUNT
BY Alfred C. Hill
AGENT INVENTORS
JOHN C. GROCE
JOHN K. BATES, JR.
DUNCAN G. HUNT
BY Alfred C. Hill
AGENT United States Patent Office 2,930,987

Patented Mar. 29, 1960

2,930,987

SIGNAL TRANSLATION SYSTEM

John C. Groce, Nutley, and John K. Bates, Jr., Bloomfield, N.J., and Duncan G. Hunt, Natick, Mass., assignors to International Telephone and Telegraph Corporation, Nutley, N.J., a corporation of Maryland Application May 23, 1955, Serial No. 510,286

7 Claims. (Cl. 330—136)

This invention relates to signal translation systems and more particularly to gain control systems therefor.

The problem of providing high-gain video, or pulse, signal amplifying systems that must handle a large dynamic range of input signals is not new to the electronic art. These amplifying systems are complicated by the fact that signals appearing at the input terminals thereof may have amplitudes as small as that of the noise, that is, several microvolts, or as large as several volts. If no special care is taken to handle the large signals, they will either drive successive stages of the amplifying system to cut-off, or cause heavy grid current to flow, causing the amplifying system to block for a considerable period after each strong signal and thereby rendering the system completely useless for the amplification of weak signals during that time.

The employment of non-linear devices, such as logarithmic amplifiers, in the prior art has provided high-gain amplification of input signals having a wide dynamic range. However, such non-linear devices are not applicable for those applications of signal amplifying systems where linear amplification is a further requirement of the embodying system. One application of such an amplifying system includes electronic directions finding systems where the techniques involved therein require the use of high-gain linear amplifiers for the amplification of a time-series, amplitude distributed input without altering the related distribution of amplitudes. An effective dynamic range of 60 db is required for best results. Another application includes a scintillation counter wherein the radiation detector employed therein has a wide dynamic range and, therefore, should be followed by an amplifying system capable of wide dynamic range operation for best results. Other such applications include pulse amplitude discriminators, and photo-electric, and other wide dynamic range, transducers.

The above requirements for an amplifying system may be achieved by providing a high-gain system possessing the required degree of linearity and inserting a manual attenuation network in an early stage of the system. To achieve the required range of operation, the attenuation network is manually adjusted so that the following circuits are not driven into the non-linear operating region when a strong signal is present at the input. However, in many applications, the time required to manually adjust an attenuation network is prohibitively long and further precludes the employment of such a system at an unattended location.

Therefore, it is an object of this invention to provide an improved signal amplitude translation system for high-gain, linear amplification of a signal having a wide dynamic range.

Another object of this invention is to provide a signal amplifying or amplitude translation system whose gain is controlled automatically in an extremely short time interval to prevent strong signal inputs from driving the amplifying system into a non-linear operating region.

Still another object of this invention is to provide a signal amplifying system whose gain is automatically controlled in response to the signal being amplified to prevent non-linear operation of the amplifying system.

A feature of this invention is the provision of a variable gain amplifier section and a control source coupled in a parallel relation with respect to the signal to be amplified. The control source includes means responsive to the amplitude of the signal for amplification to produce a control signal which varies the gain of the amplifier section to maintain a linear amplification of a wide dynamic range input signal.

Another feature of this invention is the provision of a variable gain amplifier section having a plurality of amplitude translators and a control source coupled in a parallel relation with respect to the signal to be amplified. The term "amplitude translators" herein employed refers to those devices having an output signal whose amplitude has a predetermined proportional relationship to the amplitude of the input signal, such as variable gain amplifiers and signal attenuation networks. The control source includes a plurality of output paths and means associated with each of these output paths for producing in a sequential manner trigger pulses as the amplitude of the input signal increases successively past certain discrete amplitude levels. The resultant trigger pulses operate to reduce the overall gain in said amplifier section in a stepwise fashion with the transmission characteristic of the amplitude translators being altered in sequence from the output stage to the input stage of said amplifier section.

Still another feature of this invention is the provision of a variable gain amplifier section having a single amplitude translator therein and a control source coupled in a parallel relation with respect to the signal to be amplified. The control source includes a plurality of means activated sequentially to produce trigger pulses as the amplitude of the input signal increases successively past certain discrete amplitude levels and means to couple trigger pulses of one polarity to the amplitude translator to reduce the overall gain of said amplifier section in a stepwise fashion. Other coupling means may be provided to couple trigger pulses of the opposite polarity to the amplitude translator to remove from the output thereof the effect of the trigger pulses of said one polarity in the output of said amplifying section.

Further features of this invention include multivibrator type circuits as the trigger pulse producing devices of the control source. The multivibrator type circuits in certain instances may be arranged in a parallel relation with respect to the signal applied thereto and in other instances may be arranged in a cascade relation with respect to the signal input to effect the desired quantization of the overall amplifier section gain. The gain control achieved by the control source of this amplifying system is facilitated by selecting efficient amplitude translators for inclusion within the amplifying section. There is disclosed herein as the amplitude translators a balanced amplifier having means to control the anode load of the amplifier stage in accordance with the control pulse output of the control source including as the variable portion thereof the output impedance of a negative feedback amplifier in parallel with the anode load of the amplifier stage and a signal attenuating circuit inserted within the amplifying section which is switched in and out of the signal channel.

The above mentioned and other features and objects of this invention will become more apparent by reference to the following description taken in conjunction with the accompanying drawings, in which.

Figure 1:
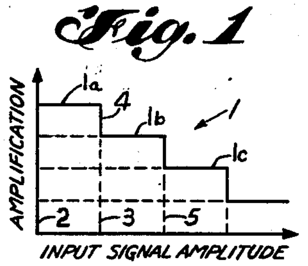
Fig. 1 is a curve of input signal amplitude versus overall system amplification useful in explaining the principles of operation of this invention.

Referring to Fig. 1, there is illustrated therein the gain characteristic achieved by the amplifying system of this invention. The overall amplifier system gain is divided, or quantized, into a number of discrete steps 1. The size of each step is determined by a number of considerations such as maximum sensitivity, tolerable departure from linearity, required dynamic range, and so forth. As the input signal amplitude increases from point 2 to point 3 the amplifying system will have maximum gain, as indicated by step 1*a*. As the signal input amplitude reaches point 3, the overall gain is instantaneously reduced, as indicated by the vertical line 4 of curve 1, to a lower gain, as indicated by step 1*b*. The gain of the amplifying system will remain unchanged until the input signal amplitude increases beyond point 5 at which time the overall gain is again instantaneously reduced to maintain the amplifying system in the linear operating region. The overall gain of the amplifying system may be quantized into as many steps as is necessary, depending upon the dynamic range of the input signal of a particular application, to maintain the amplifying system in a linear operating range. To achieve this type of gain characteristic, there are certain desiderata such as appropriate amplitude translators, such as, gain controlled amplifiers and signal attenuators, and fast acting control networks. The amplitude translators must be so integrated with the amplifier section that switching transits are made negligibly small. Control circuits must produce fast rise-time switching pulses of a duration in the order of less than a microsecond in response to the signal to be amplified for application to the appropriate amplitude translators to place these networks in the correct condition before the signal enters this portion of the amplifier section.

Figure 2:
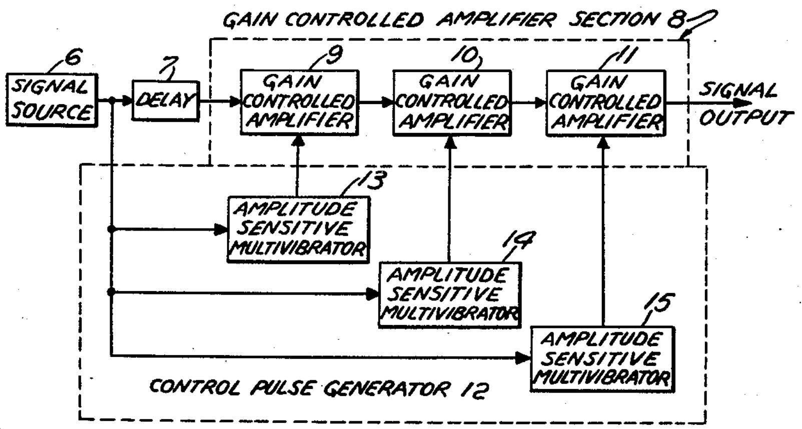
Figs. 2 and 3 are block diagrams of two embodiments employing a distributed gain control system in accordance with this invention.
Figure 3:
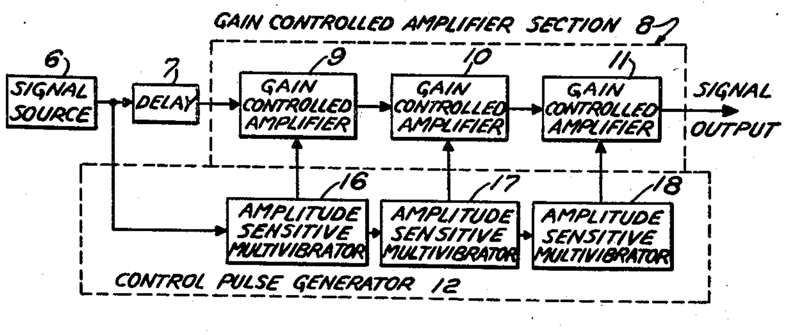

Referring to Figs. 2 and 3, there are illustrated two embodiments of an amplifying system in which the gain characteristic of Fig. 1 is achieved by distributing the amplitude translators, such as gain controlled amplifiers or signal attenuators, throughout the amplifying system. In accordance with the disclosure of Fig. 2, a signal from source 6 is coupled by means of a delay device 7 to a gain controlled amplifier section 8 including therein as amplitude translator, gain controlled amplifiers 9, 10 and 11. The signal from source 6 is directly coupled to control pulse generator 12 which includes as components thereof amplitude sensitive multivibrator type circuits 13, 14 and 15 biased for sequential actuation as the amplitude of the input signal exceeds given successively higher amplitude levels. The term "amplitude sensitive" is employed with reference to those triggered pulse generators or multivibrators sensitive to the amplitude of the trigger voltage. For instance, when the amplitude of the input signal exceeds a first given amplitude level, point 3 of Fig. 1, multivibrator 15 will be triggered resulting in an output control pulse which is coupled to amplifier 11 for attenuating the signal by reduction of the gain thereof. This gain reduction corresponds to the reduction indicated in Fig. 1 by the drop in the overall system gain from step 1*a* to step 1*b*. As the input signal amplitude increases beyond a second given amplitude level, point 5 of Fig. 1, as established by the biasing network of multivibrator 14, multivibrator 14 is triggered resulting in a control pulse which reduces the gain of amplifier 10 and thereby steps down the overall system gain characteristic as indicated by step 1*c* of Fig. 1. A further increase in input signal amplitude beyond a third given amplitude level triggers multivibrator 13 for production of a control pulse which operates on amplifier 9 to reduce its gain. Thus, the control pulses sequentially generated by pulse generator 12 are applied to the gain controlled amplifiers 9, 10, 11 advancing from the output end of the amplifying system to the input end thereof, as the input signal amplitude increases successively beyond given amplitude levels. While the circuit shown in Fig. 2 indicates only a three step quantization process, the gain characteristic of the amplifying section may be quantized into any number of steps by employing a sufficient number of attenuation networks, the number thereof depending upon the ultimate strength of the input signal and the desired degree of linearity.

As hereinabove mentioned, it is necessary for the control pulse to be generated and the amplitude translators placed in the proper condition before the signal enters this portion of the amplifying system. This requirement is met by coupling the signal of source 6 through a delay device 7 prior to impressing the signal upon the amplifier section 8. The delay of device 7 should be of sufficient length to provide time to produce the control pulses and adjust the gain of amplifier section 8 before the signal is impressed thereon.

The embodiment illustrated in Fig. 3 is substantially identical to the embodiment of Fig. 2 with the exception that the multivibrators 16, 17, and 18 incorporated in the control pulse generator 12 are arranged in a cascade arrangement rather than the parallel arrangement of Fig. 2. This cascade arrangement of the multivibrators requires that the signal be passed through preceding multivibrators so that the gain controlled amplifier adjacent the output of section 8 is first acted upon to maintain linear amplification therein if the signal exceeds the bias level of multivibrator 18. This is accomplished by employing a conventional cathode coupled single shot type multivibrator of the type having a first normally nonconductive electron discharge device and a second normally conductive electron discharge device with a capacitor interconnecting the anode of the first discharge device and the control grid of the second discharge device. The switching level of the multivibrator is adjusted by application of a bias voltage to the control grid of the first electron discharge device. The trigger potential for the multivibrator stage, the signal of source 6, is applied to the anode of the first discharge device with a negative polarity. This negative polarity can be obtained by employing a stage of amplification preceding each multivibrator stage to perform the inversion.

When the level of the trigger signal is insufficient to overcome the bias of the first discharge device, the second electron discharge device functions as a low level amplifier. Thus, any signal applied to the anode of the first discharge device whose amplitude is below the triggering level will be passed through the interconnecting capacitor to the control grid of the second discharge device and hence to succeeding stages. With the bias levels of the multivibrators 16, 17, and 18 adjusted to cause a successive triggering thereof from the output end of section 8 to the input end thereof, the signal of source 6 is coupled through multivibrators 16 and 17 to trigger multivibrator 18 first when the amplitude of the signal of source 6 exceeds the first given discrete amplitude level. As the signal amplitude increases, the trigger levels of the multivibrators are reached successively such that the gain of the amplifier 11 is first adjusted by operation of multivibrator 18, then amplifier 10 is adjusted as the bias level of multivibrator 17 is exceeded. Finally gain controlled amplifier 9 will be adjusted when the input signal exceeds the bias level of multivibrator 16.

Figure 4:
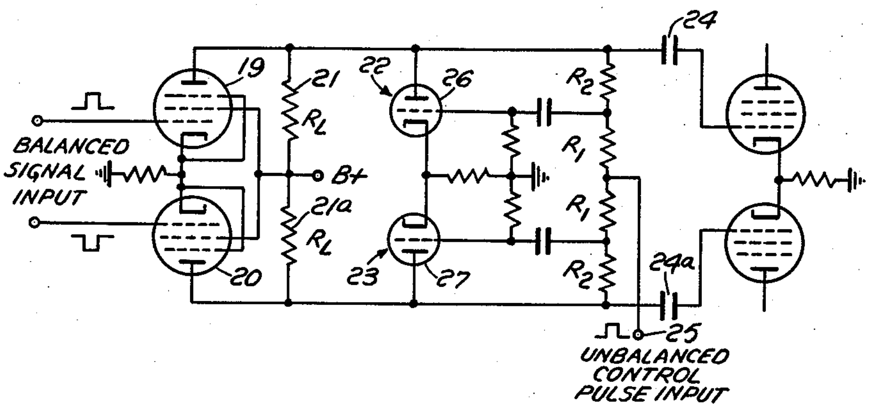
Fig. 4 is a schematic diagram of a variable gain amplifier stage which may be employed in the systems of Figs. 2, 3, and 7.

Fig. 4 is a schematic diagram of a gain controlled amplifier stage, a plurality of which may be arranged in cascade to provide the amplifier section 8 of the amplifying systems of Figs. 2 and 3. It consists of electron discharge devices 19 and 20 connected in a push pull arrangement for amplification of a balanced input applied thereto. The balanced output at the anodes of devices 19 and 20 is developed across a push pull connected load including load resistors 21 and **21*a* paralleled respectively by negative feedback amplifiers 22 and 23. The developed balanced output is coupled from the parallel connected push pull arrangement by means of condensers 24 and 24*a*** to the succeeding stages.

The gain of the circuit of Fig. 4 is varied by changing the value of the anode load of electron discharge device 19. This is accomplished by changing the output impedance of amplifiers 22 and 23 in accordance with the output of generator 12 applied at terminal 25 and coupled in common to the control grids of electron discharge devices 26 and 27. The employment of negative feedback amplifiers 22 and 23 in this manner reduces the susceptibility of the circuits to unbalance due to tube variation and thus enhances the attainment of linear amplification. The employment of the push pull arrangement and the introduction of the control pulse in single ended form to the control grids of electron discharge devices 26 and 27 of feed-back amplifiers 22 and 23 eliminates the need for a cancellation pulse to remove the effect of the control pulse from the output signal coupled through condensers 28. Although this circuit arrangement requires twice as many tubes as a single ended amplifier, the desired gain control is obtained with very little sacrifice of bandwidth and, in fact, the bandwidth will increase with the amount of attenuation due to the lower anode loads.

To facilitate the understanding of the operation of this gain controlling amplifier stage, let us consider one-half of the push pull arrangement consisting of electron discharge devices 19 and 26 and their associated circuitry. The gain equation for this half of the push pull stage is:

$$K=\frac{-gm_1R_L}{1+gm_2BR_L}$$

where K is the gain, $gm_1$ is the transconductance of electron discharge device 19, $gm_2$ is the transconductance of the electron discharge device 26 which is varied in accordance with the amplitude of the control pulse applied at terminal 25, $R_L$ is the load resistor 21 of electron discharge device 19 and B is the feedback present in the feedback amplifier 22 where $$B=\frac{R_1}{R_1+R_2}$$

Assume $R_1<rp_2$, where $rp_2$ is the plate resistance of the electron discharge 26.

Thus, we have two parameters of electron discharge device 26, namely, $gm_2$ and $R_L$, which can be varied independently of electron discharge device 19. When electron discharge device 26 is cut off ($gm_2=0$), the gain K is the usual $-gm_1R_L$. This condition is the normal condition of the gain controlling amplifier stage. During the time interval that the control pulse is applied at terminal 25, electron discharge device 26 is driven into conduction and the gain of the amplifying stage becomes $$K=\frac{-gm_1R_L}{1+gm_2BR_L}$$

Thus, the gain of the amplifier stage has been reduced during the time interval of the control pulse producing a reduction in the overall gain of the amplifying system. The behavior of the other half of the balanced push pull arrangement will be complementary in nature as will be recognized by those skilled in the art.

While we have shown the control of the anode load by employing a negative feedback amplifier arrangement in parallel relation therewith, it is to be clearly understood that this is not the only way of accomplishing gain control by variation of the active parameters in the amplifier section. It is conceivable that an active parameter, such as the anode load 21 of electron discharge device 19, could be varied by employing a passive load in combination therewith which is varied by diode switching. It is further possible to vary the transconductance of the amplifying system in accordance with the output of the control pulse source by introducing the control pulse on any of the electrodes of the amplifying electron discharge device such that the operating point is moved from its normal value to one which gives lower gain for the duration of the pulse, after which full gain is resumed.

Figure 5:
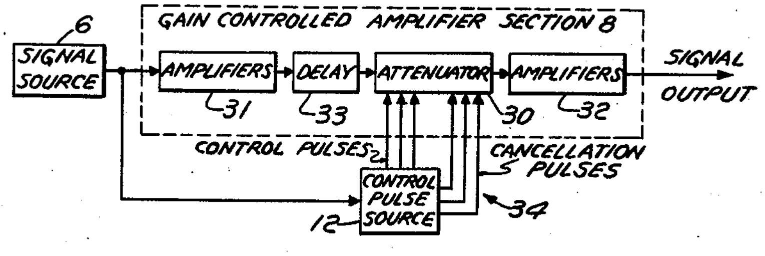
Fig. 5 is a block diagram of an embodiment employing a lumped gain control system in accordance with this invention.

Referring to Fig. 5, a modification of the amplifying system is illustrated to include a lumped amplitude translator in gain controlled amplifier section 8. The lumped amplitude translator includes attenuator 30 disposed at a point intermediate amplifiers 31 and 32. The signal from source 6 is coupled to amplifier 31, through delay device 33 and hence to attenuator 30, the attenuation thereof being controlled by control pulses of control source 12 to reduce the overall system gain in discrete steps. The gain controlled or attenuated output of attenuator 30 is coupled to amplifier 32 and hence to further circuit components. The control pulse source 12 may include multivibrator type circuits arranged as illustrated in either Figs. 2 or 3 to provide control pulses sequentially in response to the amplitude of the signal of source 6. As the amplitude of the signal of source 6 increases, the attenuation of attenuator 30 is increased in a predetermined manner to provide an overall linear gain characteristic for the amplifying system.

In the system of Fig. 5, the effect of the control pulses would be reflected in the output of attenuator 30 as unwanted disturbance thereof. To overcome these disturbances, a trigger pulse of polarity opposite to the polarity of the control pulses are coupled along conductors 34, in time coincidence with the corresponding control pulse, to cancel the effect of the control pulse in the output of attenuator 30. The cancellation pulses may be derived from that multivibrator circuit producing the control pulse by appropriate connection to the other anode of this multivibrator circuit.

The arrangement of multiple step attenuation, lumped at a point within amplifier section 8, has the advantage of requiring fewer components, smaller space, and of concentrating the gain control circuits at one point within the amplifier system.

Figure 6:
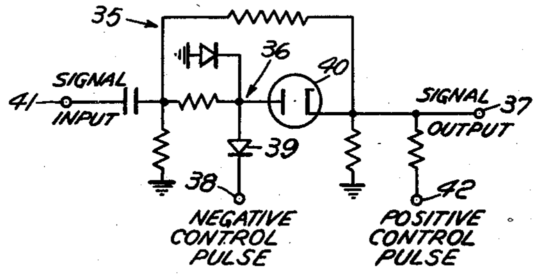
Fig. 6 is a schematic diagram of a signal attenuating circuit which may be employed in the systems of Figs. 5 and 7.

As disclosed in Fig. 5, the gain control for the amplifying system of this invention can be accomplished by inserting signal attenuators at one point between amplifier stages and switching these attenuators in and out of the signal channel to appropriately adjust the overall gain of this system. Fig. 6 illustrates a signal attenuator in schematic form which may be utilized as a portion of attenuator 30 of Fig. 5. To provide a three step gain control arrangement three such attenuators would be combined in a manner to appropriately increase the attenuation of the transmission characteristic of the amplifier section 8 and hence reduce the system gain.

The elemental circuit of Fig. 6 employs two parallel signal paths of which path 35 constitutes a high attenuation path and path 36 constitutes a low attenuation path. In normal operation the signal passes through both paths in parallel and reaches the output terminal 37 only slightly attenuated. When it is desired to increase the attenuation, a negative control pulse is applied to terminal 38 causing conduction in rectifier 39 and thereby biases diode 40 into non-conduction to prevent the passage of the signal through path 36. The signal applied to terminal 41 then passes through path 35 only, which is the high attenuation path. A positive control pulse is applied at terminal 42 to cancel the pedestal resulting from the negative control pulse applied at terminal 38 which would otherwise appear at output terminal 37.

Although the circuit arrangement is illustrated to be a single ended arrangement, the circuit could be arranged in a balanced or double ended manner which would eliminate the necessity of applying a cancellation pulse to terminal 42.

While we have disclosed one gain control arrangement operating on passive elements, such as, the signal attenuator, included in the amplifier section 8, it is to be understood that this is not the only manner of controlling the gain in amplifier section 8. Diode switching of resistances, or other passive elements, can also be employed to control the gain. The anode load of an amplifier can be adjusted by switching another resistance into the circuit, or by switching a capacitor into the circuit to bypass one of a plurality of series connected anode load resistors. Similar methods can be used to change the value of unbypassed cathode resistances included in an amplifier circuit.

Figure 7:
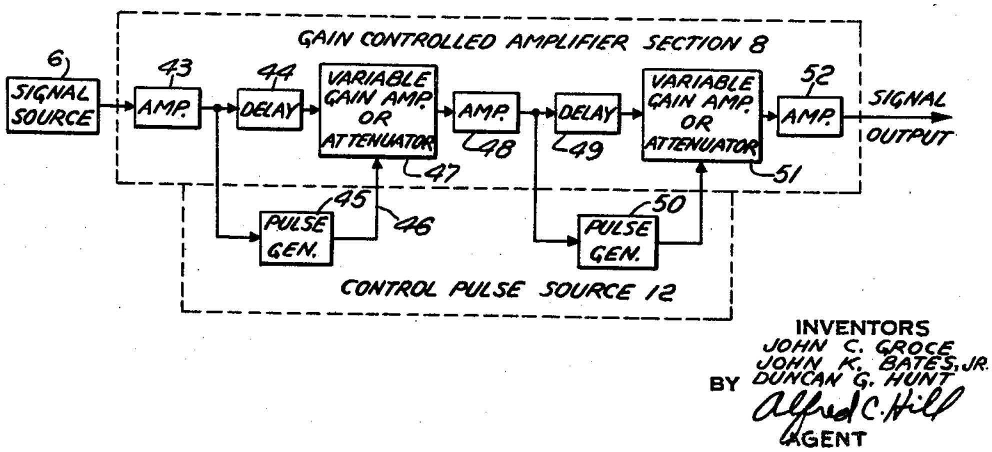
Fig. 7 is a block diagram of still another embodiment of this invention.

Fig. 7 illustrates a further embodiment of an amplifying system including an integrated control arrangement instead of utilizing a separate control channel as described in connection with Figs. 2, 3, and 5. The amplifier section of this embodiment includes an amplifier 43 coupled to signal source 6. The output of amplifier 43 is coupled to a delay device 44 and a pulse generator 45 in parallel. The pulse generator 45 may include a single multivibrator type circuit and constitutes a portion of control pulse source 12. Pulse generator 45 is triggered to produce a control pulse if the output of ampliger 43 exceeds a given amplitude level as established by the bias of the amplitude sensitive generator 45. When a control pulse is produced it is coupled by conductor 46 to an attenuation network 47 to reduce the overall system amplification. The attenuation network 47 may include a gain controlled amplifier as disclosed in Fig. 4 or an attenuator as disclosed in Fig. 6.

The output of device 47 is coupled to amplifier 48 whose output is coupled in parallel to delay device 49 and pulse generator 50 for control of the signal transmission characteristics in attenuation network 51. If the output of amplifier 48 exceeds another given amplitude level, the amplitude sensitive multivibrator or generator 50 is triggered to generate a control pulse. As was the case with device 47, device 51 may include the amplifier of Fig. 4, or the attenuator of Fig. 6, or any other suitable arrangement to achieve the desired gain control. The output of device 51 is coupled through amplifier 52 to succeeding circuitry which may include further gain controlling arrangements if the dynamic range of the input signal is such that further control is required for achievement of the desired degree of linearity.

As pointed out in connection with Figs. 2, 3, and 5, the bias levels of generators 45 and 50 are so arranged that generator 50 would first be triggered for control pulse production as the signal amplitude exceeds a first given level and then generator 45 would be triggered sequentially if the signal amplitude exceeds a second given amplitude level. The individual control pulses produced in pulse source 12 are produced by the triggering of the pulse generators therein by the signal present in the signal channel immediately preceding the circuit whose transmission characteristic is to be controlled to provide a high gain, linear amplification of an input signal having a wide dynamic range.

While we have described above the principles of our invention in connection with specific apparatus, it is to be clearly understood that this description is made only by way of example and not as a limitation to the scope of our invention as set forth in the objects thereof and in the accompanying claims.

We claim:

1. A signal amplifying system comprising an amplifier section including an input terminal, an output terminal and a plurality of variable gain amplifier stages disposed therebetween, a signal source, a control source, means coupling the output of said signal source in parallel to said input terminal and said control source, said control source being responsive to the amplitude of the signal of said signal source to produce a plurality of control pulse signals in sequence, said control source including a first pulse generator biased for operation at a first given signal amplitude, a second pulse generator biased for operation at a second given signal amplitude, and a third pulse generator biased for operation at a third given signal amplitude, each of said pulse generators being triggered into operation for control pulse production as the amplitude of the signal of said source exceeds the corresponding given signal amplitude, and means coupling the control pulse output of each of said pulse generators to said amplifier stages in sequence from the output terminal end of said amplifier stages to the input terminal end of said amplifier stages as the signal of said signal source exceeds each of said given amplitude levels to reduce the gain of said amplifier section in a stepwise manner to provide linear amplification of the signal of said signal source.

2. A system according to claim 1, wherein said pulse generators include multivibrators coupled in a parallel relationship with respect to the output of said signal source and said means coupling the output of said signal source to said input terminal includes a delay device.

3. A system according to claim 1, wherein said pulse generators include multivibrators coupled in cascade with respect to the output of said signal source and said means coupling the output of said signal source to said input terminal includes a delay device.

4. A system according to claim 1, wherein each of said variable gain amplifier stages includes a first electron discharge device having at least an anode, a cathode and a control grid, means coupling the signal of said signal source to said control grid, means coupling said cathode to a reference potential, a resistive output load coupled to said anode, a variable resistance device coupled in a parallel relation to said resistive output load, and means coupling a control pulse of said control pulse source to said variable resistance device to change the effective resistive load of said first discharge device to adjust the gain thereof.

5. A signal amplifying system comprising an amplifier section including an input terminal, an output terminal and a plurality of variable gain amplifier stages disposed therebetween, a signal source, a control source, means coupling the signal of said signal source in parallel to said input terminal and said control source, said control source being responsive to the amplitude of the signal of said signal source to produce a plurality of control pulse signals in sequence, said control source including a first pulse generator biased for operation at a first given signal amplitude, a second pulse generator biased for operation at a second given signal amplitude, and a third pulse generator biased for operation at a third given signal amplitude, each of said pulse generators being triggered into operation for control pulse production as the signal of the amplitude of the signal of said source exceeds the corresponding given signal amplitude, and means coupling the control pulse output of each of said pulse generators to said amplifier stages in sequence from the output terminal end of said amplifier stages to the input terminal end of said amplifier stages as the signal of said signal source exceeds each of said given amplitude levels to reduce the gain of said amplifier section in a stepwise manner to provide linear amplification of the signal of said signal source, each of said variable gain amplifier stages including a first electron discharge device having at least an anode, a cathode and a control grid, means coupling the signal of said signal source to said control grid, means coupling said cathode to a reference potential, a resistive output load coupled to said anode, a variable resistance device coupled in a parallel relation to said resistive output load, and means coupling a control pulse of said control pulse source to said variable resistance device to change the effective resistive load of said first discharge device to adjust the gain thereof, said variable resistance device including a second electron discharge device having an anode, a cathode and a control grid, means coupling the anode of said second discharge device to the anode of said first discharge device, means coupling the cathode of said second discharge device to said reference potential, a means coupled to the anode and the control grid of said second discharge device to provide a negative feedback path, and means coupling said control pulse to the control grid of said second discharge device to change the effective resistance thereof for adjustment of the gain of said first electron discharge device.

6. A signal amplifying system comprising an amplifier section including an input terminal, an output terminal and a plurality of variable gain amplifier stages disposed therebetween, a signal source, a control source, means coupling the signal of said signal source in parallel to said input terminal and said control source, said control source being responsive to the amplitude of the signal of said signal source to produce a plurality of control pulse signals in sequence, said control source including a first pulse generator biased for operation at a first given signal amplitude, a second pulse generator biased for operation at a second given signal amplitude, and a third pulse generator biased for operation at a third given signal amplitude, each of said pulse generators being triggered into operation for control pulse production as the amplitude of the signal of said source exceeds the corresponding given signal amplitude, and means coupling the control pulse output of each of said pulse generators to said amplifier stages in sequence from the output terminal end of said amplifier stages to the input terminal end of said amplifier stages as the signal of said signal source exceeds each of said given amplitude levels to reduce the gain of said amplifier section in a stepwise manner to provide linear amplification of the signal of said signal source, each of said variable gain amplifier stages including a first electron discharge device having at least an anode, a cathode and a control grid, a second electron discharge device having at least an anode, a cathode and a control grid, means coupling the signal for amplification of one polarity to the control grid of said first discharge device, means coupling the signal for amplification of a polarity opposite to said one polarity to the control grid of said second discharge device, means coupling the cathode of said first and second discharge devices to a reference potential, a first resistive output load having one end thereof coupled to the anode of said first discharge device, a second resistive output load having one end thereof coupled to the anode of said second discharge device, means coupling the other end of each of said resistive output loads to a common point, a first variable resistance device having two sections, one of said sections being coupled in a parallel relation to said first resistive output load and the other of said sections being coupled in a parallel relation to said second resistive output load, and means coupling a control pulse of said control pulse source in common to the sections of said variable resistance device to change the effective resistive load of said first and second discharge devices to adjust the gain of said amplifier stage.

7. A system according to claim 6, wherein said variable resistance device comprises a first section including a third electron discharge device having an anode, a cathode and a control grid, means coupling the anode of said third discharge device to the anode of said first discharge device, means coupling the cathode of said third discharge device to said reference potential, and a means coupled to the anode and the control grid of said third discharge device to provide a negative feedback path, a second section including a fourth electron discharge device having an anode, a cathode and a control grid, means coupling the anode of said fourth discharge device to the anode of said second discharge device, means coupling the cathode of said fourth discharge device to said reference potential, and a means coupled to the anode and the control grid of said fourth discharge device to provide a negative feedback path, and means coupling said control pulse in common to the control grid of said third and fourth discharge devices to change the effective resistance thereof for adjustment of the gain of said first and second discharge devices.

References Cited in the file of this patent

UNITED STATES PATENTS

| | | |
|---|---|---|
| 1,574,780 | Afel | Mar. 2, 1926 |
| 2,084,115 | Terry | June 15, 1937 |
| 2,244,695 | Hathaway | June 10, 1941 |
| 2,295,410 | Kreuzer | Sept. 8, 1942 |
| 2,480,195 | Posthumus | Aug. 30, 1949 |
| 2,492,363 | Kellogg | Dec. 27, 1949 |
| 2,519,359 | Dean | Aug. 22, 1950 |
| 2,592,308 | Meachem | Apr. 8, 1952 |
| 2,600,051 | Fay et al. | June 10, 1952 |
| 2,639,423 | Sherr | May 19, 1953 |
| 2,700,074 | Cotsworth | Jan. 18, 1955 |
| 2,723,387 | Slavin | Nov. 8, 1955 |
| 2,835,746 | Montgomery | May 20, 1958 |
| 2,866,015 | Sailor | Dec. 23, 1958 |